Dec. 28, 1965  C. J. FALCON ETAL  3,225,879
TELESCOPING CONVEYOR
Filed Feb. 14, 1963  2 Sheets-Sheet 1
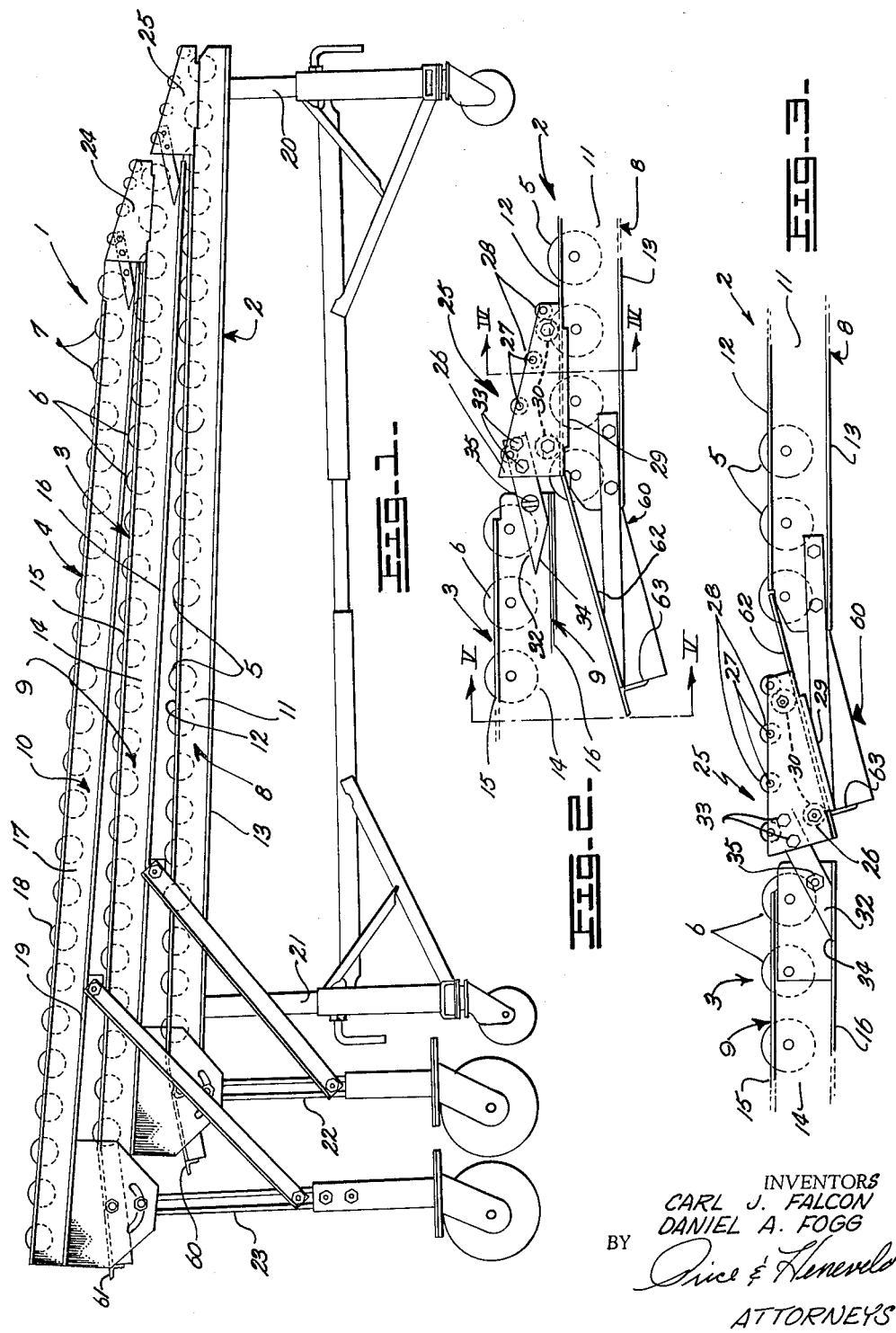
INVENTORS
CARL J. FALCON
DANIEL A. FOGG
BY
Price & Heneveld
ATTORNEYS Dec. 28, 1965  C. J. FALCON ETAL  3,225,879
TELESCOPING CONVEYOR
Filed Feb. 14, 1963  2 Sheets-Sheet 2
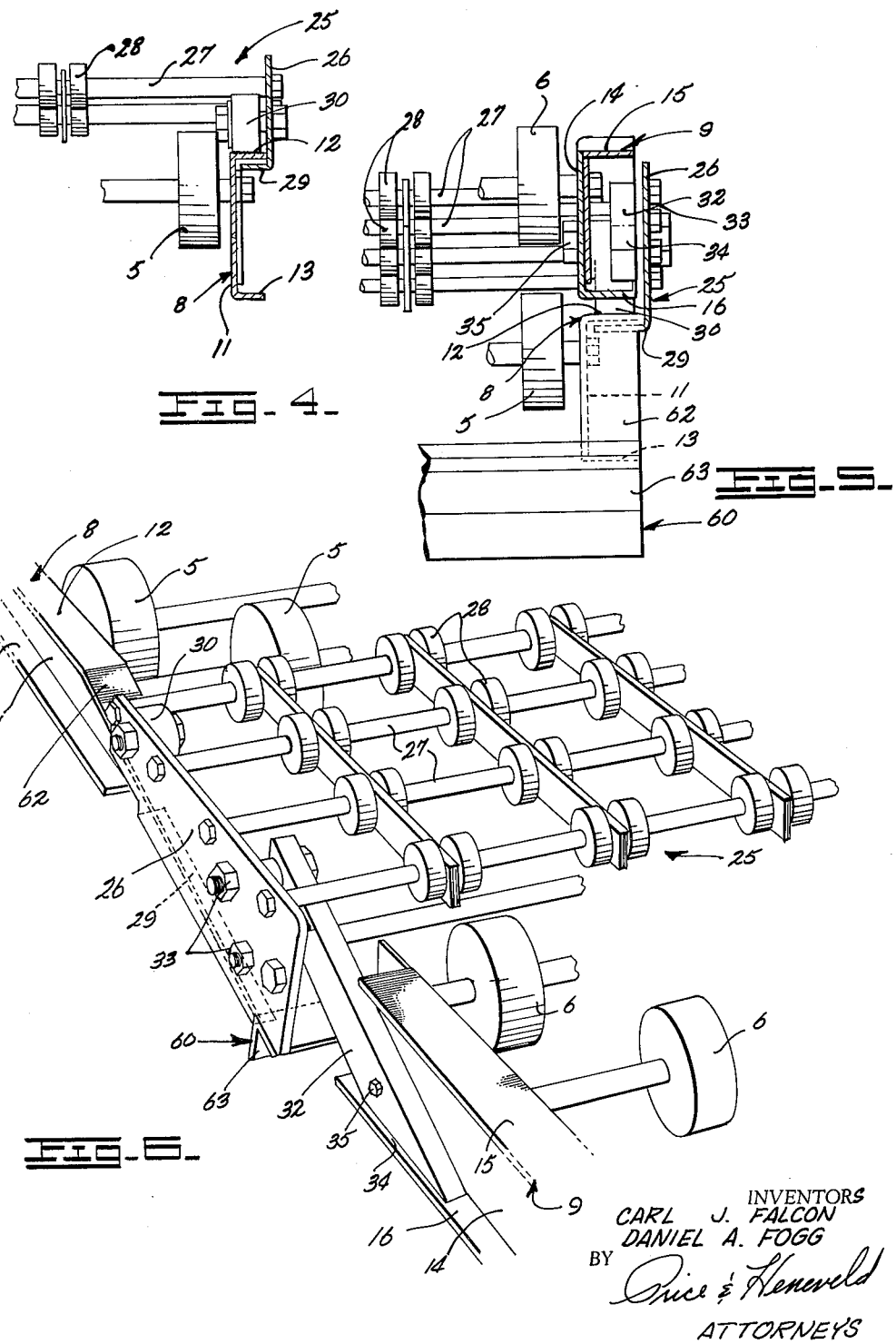
INVENTORS
CARL J. FALCON
DANIEL A. FOGG
BY
Price & Heneveld
ATTORNEYS

United States Patent Office 3,225,879
Patented Dec. 28, 1965

3,225,879
TELESCOPING CONVEYOR
Carl J. Falcon, Grand Rapids, and Daniel A. Fogg, White Cloud, Mich., assignors to The Rapids-Standard Company, Inc., Grand Rapids, Mich., a corporation of Michigan
Filed Feb. 14, 1963, Ser. No. 258,586
4 Claims. (Cl. 193—35)

This invention relates to a telescoping gravity conveyor. More particularly, this invention relates to a telescoping gravity conveyor having an improved apparatus for connecting sections of the telescoping conveyor together.

Telescoping gravity conveyors are old and well-known to the conveying art. Such conveyors include a plurality of conveying sections adapted to telescope lengthwise one upon the other, the sections being interconnected so that a continuous conveying surface is provided when the telescoping conveyor is fully extended. Such structures presently in existence utilize a connecting means which exhibits many inherent disadvantages. The primary disadvantage is the fact that structures presently in existence must have the sections fully extended with respect to one another in order to operate efficiently. If the sections are only partially extended with respect to one another, articles moving along the conveyor as a whole are subjected to a bump which in many cases greatly reduces the efficiency and operability thereof. Since telescoping conveyors may well be utilized when the sections are partially extended just as often as when the sections are fully extended, this problem has seriously limited their application.

It is therefore an object of this invention to provide a telescoping conveyor having an improved connecting means between its conveying sections.

A further object of this invention is the provision of such a conveyor which may be utilized as effectively when the individual sections are partially extended one with respect to the other as when the sections are fully extended.

An additional object of this invention is the provision of such a conveyor utilizing a connecting means adding rigidity to the overall structure and including an improved means for properly aligning the individual sections one with respect to the other.

A still further object of this invention is the provision of such a conveyor accomplishing these results with retention of relatively simply construction and design.

These and further objects of this invention will become obvious to those skilled in the conveying art upon reading the following specification in conjunction with the accompanying drawings, wherein:

FIG. 1 is a side view of a telescoping conveyor utilizing a connecting means comprising the improvement of this invention;

FIG. 2 is an enlarged side view showing the connecting means comprising this invention, two sections of the conveyor positioned just prior to full extension;

FIG. 3 is a view similar to FIG. 2, the two sections being fully extended;

FIG. 4 is a cross-sectional view taken along the plane IV—IV of FIG. 2;

FIG. 5 is a cross-sectional view taken along the plane V—V of FIG. 2; and

FIG. 6 is a perspective view showing the connecting element and its association with the conveyor sections.

Briefly, this invention relates to an extendible conveyor including at least two conveyor sections adapted to telescope together. A connecting element is operably secured between the sections, the element having conveying means associated therewith. Rollers are secured at the sides of the element adapted to ride on the sides of one of the sections. Downwardly sloping guides extend with the sides from one end of this one section, forming an extension thereof. An arm extends from each of the sides of the element toward the said one end of the one section. The arms are pivotally secured to the sides of the other section. Thus, movement of the sections apart from each other moves the rollers along the sides of the one section and down the guides as the arms pivot with respect to the other section, the conveying means on the element forming a continuous conveying surface between the sections.

Referring more specifically to the drawings, the reference numeral 1 designates a telescoping conveyor (FIG. 1) having a plurality of individual conveying sections 2, 3 and 4. In the embodiment shown, each of the sections are of the gravity conveying type, including conveying rollers 5, 6 and 7 respectively. These rollers 5, 6 and 7 are rotatably received between side channels 8, 9 and 10 respectively. The side channels 8 of section 2 each include a vertical web 11, an outwardly extending horizontal upper flange 12 and an outwardly extending horizontal lower flange 13. Similarly, the side channels 9 of section 3 include a web 14 and upper and lower flanges 15 and 16 respectively. The side channels 10 of the section 4 each include webs 17 and upper and lower flanges 18 and 19 respectively. Section 2 is supported at both of its ends by means of legs 20 and 21. The sections 3 and 4 are supported at only one of their ends by means of the legs 22 and 23 respectively. Downwardly sloping guides 60 and 61 are secured to an end of the sections 2 and 3 respectively forming extensions thereof, the structure and purpose thereof to be more fully described hereinafter. Sections 3 and 4 are connected by means of a connecting element 24 and sections 2 and 3 are connected by means of connecting element 25. The connecting elements 24 and 25 are of identical construction, the element 25 now being described in detail.

In the embodiment shown, the connecting element 25 includes a pair of side plates 26 (FIGS. 2 and 6). A plurality of shafts 27 extend between the side plates 26, rollers 28 being positioned on the shafts 27. It will be noted that the rollers 28 form a conveying surface, the rollers 28 being of a size considerably smaller than that of the rollers 5, 6 and 7, the purpose of which will be more fully explained hereinafter. A flange 29 extends along the bottom of each side plate 26, the flange 29 lying in a plane non-parallel to the plane passing through the plurality of shafts 27. A pair of rollers 30 are rotatably secured to each of the side plates 26, the rollers lying above the flanges 29. It will now be seen that the connecting element 25 is received on the section 2, the upper flanges 12 of the side channels 8 of the section 2 being received between the flanges 29 and the rollers 30 of the connecting element 25. Thus, the connecting element 25 is free to move along the section 2, the rollers 30 moving along the upper flanges 12.

A rigid arm 32 is rigidly secured to each side plate 26 by means of bolts 33. It will be noted that the free end 34 of each arm 32 is tapered, the purpose of which will be more fully explained hereinafter. Each arm 32 is pivotally secured at 35 to the respective web 14 of the side channels 9 of the section 3. Thus, it will now be seen that the connecting element 25 interconnects the sections 2 and 3 together.

The guides 60 and 61 are identical, the guide 60 (FIGS. 2 and 3) now being described in detail. The guide 60 slopes downwardly from the upper flange 12 of the side channels 8 of section 2, including a flange 62 forming a sloping extension therewith. A stop 63 depends from the flanges 62 adjacent the ends thereof. It will thus be seen that the rollers 30 of the connecting element 25 are adapted to roll from the upper flanges 12 onto the flanges 62 of the guide 60, abutment of the flange 29 with the stop 63 determining the limit of such travel.

*Operation*

The telescoping conveyor of this invention operates as follows. As shown in FIG. 1, the sections 2, 3 and 4 lie one above the other when telescoped together. When the conveyor is to be extended, force is merely applied to the respective sections drawing them apart. For example, by pulling section 3 to the left as shown in FIG. 1, the section 3 moves with respect to section 2 by means of the connecting element 25 (FIGS. 2, 4 and 5). The arms 32 of the connecting element 25, pivotally secured to the section 3 at 35, draw the connecting element 25 along the section 2, the rollers 30 moving along the upper flange 12 which is positioned between the rollers 30 and the flanges 29 of the connecting element. It should be noted at this point that the flanges 29 hold the connecting element in the same plane as that of the section 2. Since the plurality of shafts 27 lie in a plane sloped to the plane of the section 2, a gradual sloping transition is provided between the sections 3 and 2. This gradual slope is accomplished by the unique connection of the element 25 between the sections, and the small size of the conveyor rollers 28 when compared with the rollers 5 and 6 of the sections 2 and 3 respectively. Thus, even though the sections 2 and 3 are not fully extended with respect to each other, a smooth transition is provided in the conveying surface, thus allowing the conveyor 1 to operate very effectively in partially telescoped position.

When the conveyor 1 is to be fully extended, the sections 2 and 3 are further extended one with respect to the other. This causes the rollers 30 to move from the flanges 12 to the flanges 62 as shown in FIG. 3. As the rollers move to the flanges 62, the position of the connecting element 25 changes, this being possible by means of the pivotal connection 35 of the arms 32 to the section 3. The stops 63 determine the limit of movement of the connecting element 25 with respect to the guide 60, the flanges 29 on the side plates 26 of the element 25 engaging the stops 63 (FIGS. 3 and 6). Simultaneously, the ends 34 of the arms 32 bear against the lower flanges 16 of the side channels 9 of the section 3. Thus, in fully extended position, the structure is especially rigid due to this structure together with the stops 63. Rigid support is thus provided for the section 3, being unsupported at its end, the structure locking the two sections together and preventing relative movement thereof as articles move over the rollers 6, 28 and 5. Again, due to the positioning of the shafts 27 with respect to the flanges 29, the rollers 28 provide a completely level connection with the rollers 6 and 5.

When the sections are to be telescoped together after being in fully extended position, one merely moves the section 3 toward the section 2. The rollers 30 then ride up the flanges 62, the arms 32 pivoting with respect to the section 3. The rollers 30 pass from the flanges 62 onto the upper flanges 12, whereupon continuous movement of the section 3 toward the section 2 completely telescopes the conveyor 1.

It will now be seen that this invention has provided a telescoping conveyor having an improved means of connecting the telescoping sections together. With the structure described, the transition between the various sections when partially telescoped is so slight that the conveyor 1 may be effectively used in such a position. The connection between the sections is especially smooth in operation and provides exceptional rigidity when the sections are fully extended one with respect to the other. Further, the design is relatively simple even though such results are achieved.

While only one embodiment of this invention has been shown and described, it may be possible to practice the invention through the utilization of certain other embodiments. Such other embodiments are to be included as part of this invention unless the following claims specifically state otherwise.

We claim:

1. An extendible gravity conveyor, including: at least two conveyor sections adapted to telescope together, said sections vertically spaced from each other in telescoped position; horizontal flanges extending along the sides of said sections; a connecting element operably secured between said sections, said element having a pair of side plates and conveying means interconnecting said plates; rollers secured to said plates of said element adapted to ride on said flanges of one of said sections; downwardly sloping guide flanges serving as an extension of said flanges from one end of said one section; an arm secured to and extending from each plate of said element toward the adjacent end of the other of said sections and pivotally secured to the sides of said other section, when said sections are shifted apart lengthwise said rollers travel along said flanges of said one section and down said guide flanges, the inclination of said guide flanges causing said arms to pivot with respect to said other section, shifting said element into a plane common to both of said sections for forming a continuous conveying surface between said sections.

2. An extendible conveyor as defined in claim 1, each of said side plates of said element including a flange along its bottom, said flanges of said one section received between said rollers and said flanges of said element.

3. An extendible conveyor as defined in claim 1, the ends of said arms bearing against said other section when said sections are extended.

4. An extendible conveyor as defined in claim 1, channels having top and bottom flanges extending outwardly from and along said sides of each of said sections, said rollers moving along the top flanges of said one section and said arms bearing against the bottom flanges of said other section; each of said side plates of said element including an inwardly extending flange along its bottom, said top flange of said one section received between said rollers and flanges of said element; said conveying means comprising a series of rollers rotatably mounted on a plurality of shafts extending between said side plates of said element, said shafts lying in a plane inclined to the plane passing through the conveying surface of said one section; and a stop positioned adjacent the end of each of said guide flanges, said flanges of said elements bearing against said stops for aiding in the positioning of said element.

References Cited by the Examiner

UNITED STATES PATENTS

| | | | |
|---|---|---|---|
| 2,732,922 | 1/1956 | McLaughlin | 193—35 |
| 2,760,617 | 8/1956 | Bowen | 193—35 |
| 3,059,747 | 10/1962 | Sullivan | 193—35 |

SAMUEL F. COLEMAN, *Primary Examiner.*

ANDRES H. NIELSEN, *Examiner.*